May 24, 1932.                M. STANDISH                1,860,119
                              TRUCK BODY
                       Filed Aug. 20, 1928      3 Sheets-Sheet 2
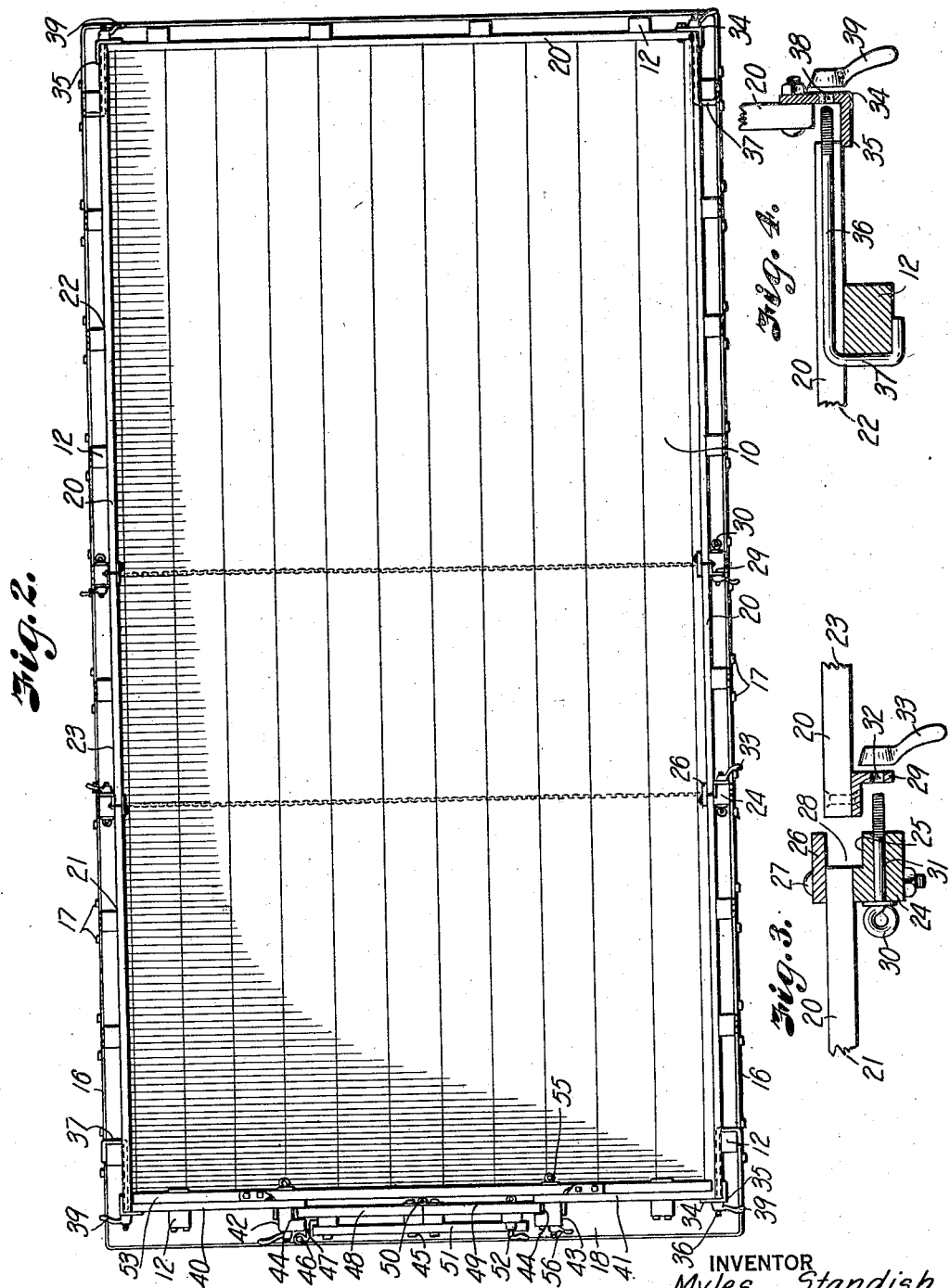
INVENTOR
Myles Standish
BY
ATTORNEY May 24, 1932. M. STANDISH 1,860,119
TRUCK BODY
Filed Aug. 20, 1928  3 Sheets-Sheet 3
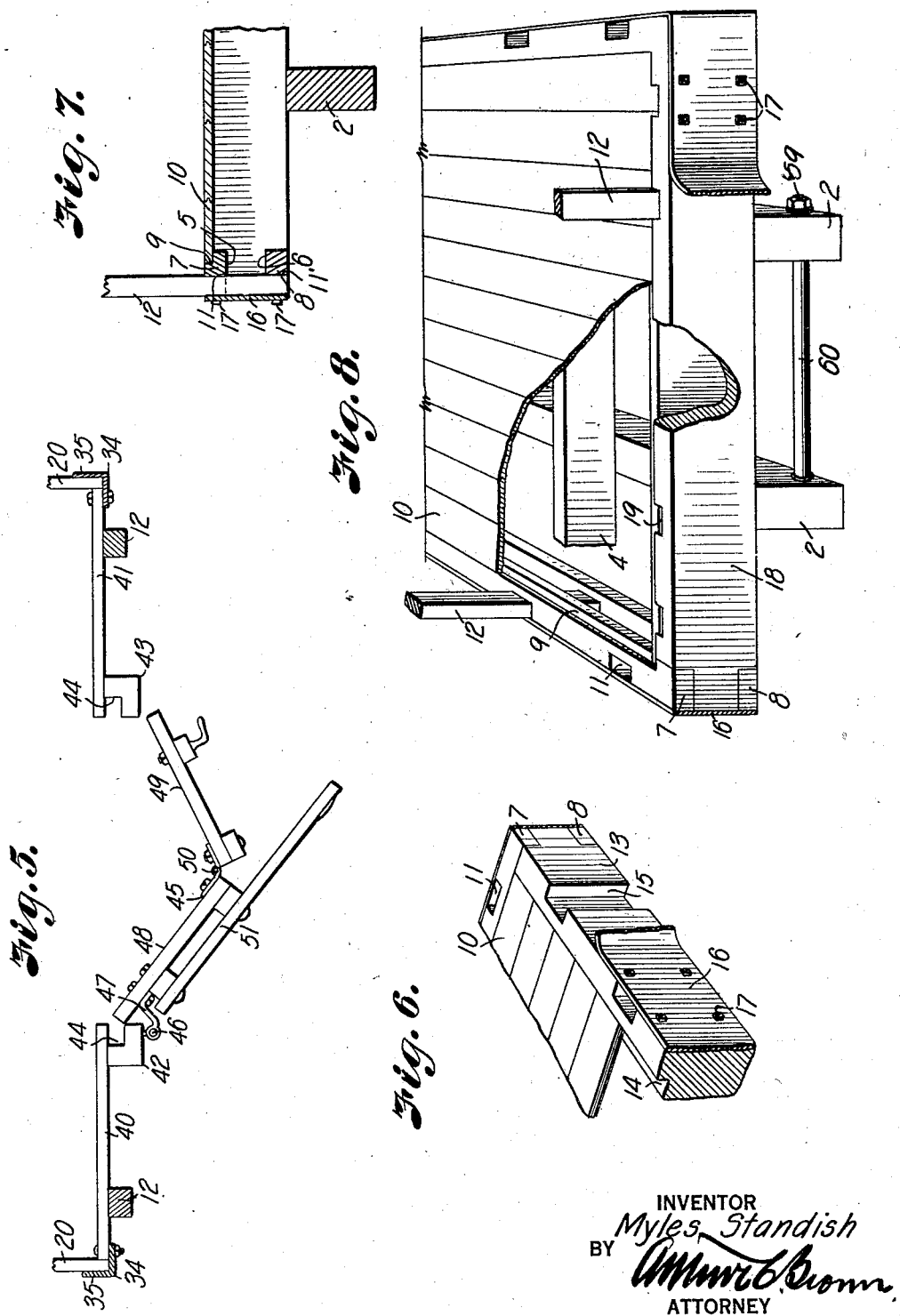
INVENTOR
Myles Standish
BY
ATTORNEY Patented May 24, 1932

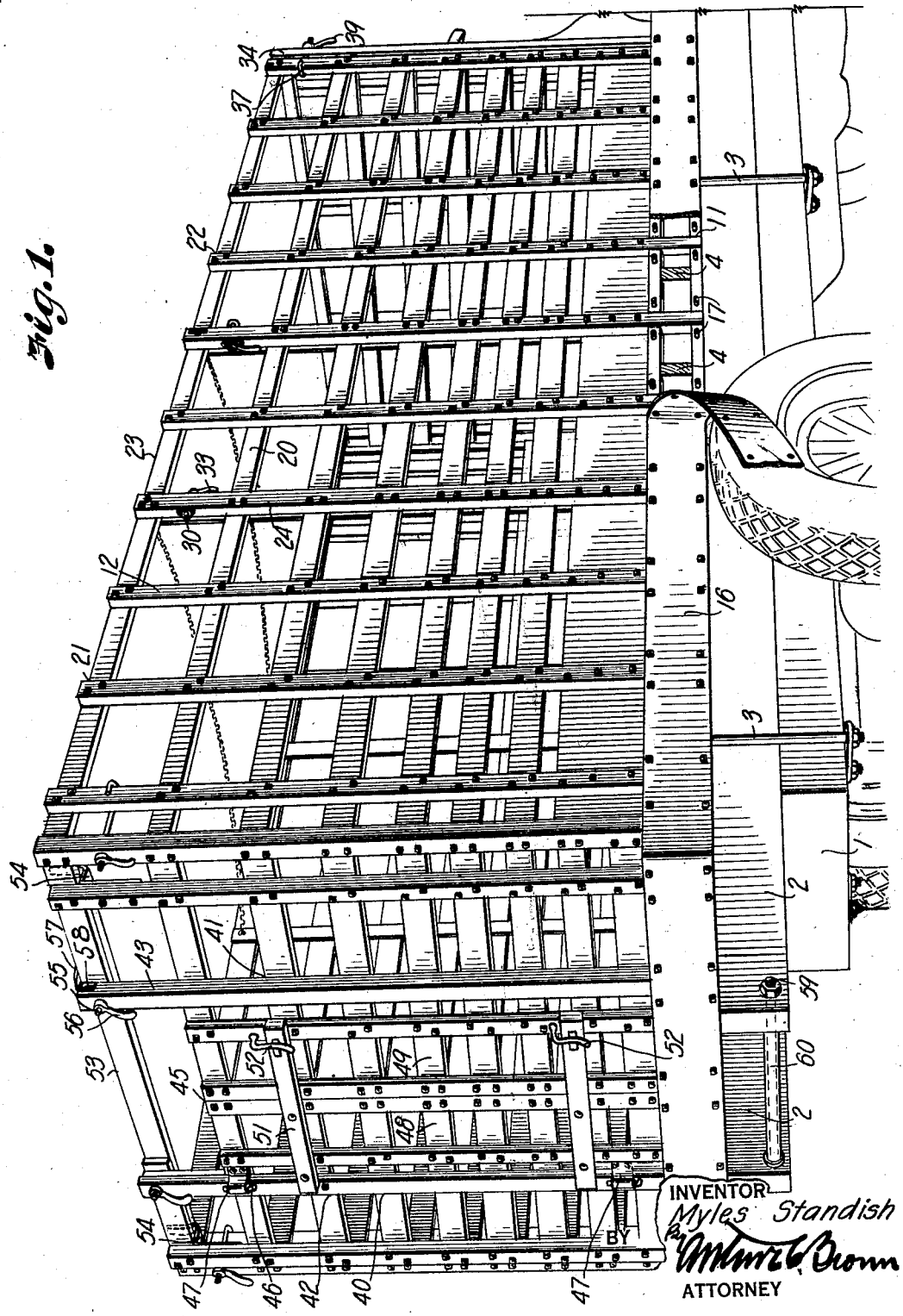

1,860,119

UNITED STATES PATENT OFFICE

MYLES STANDISH, OF COUNCIL BLUFFS, IOWA

TRUCK BODY

Application filed August 20, 1928. Serial No. 300,725.

My invention relates to truck bodies and has for its primary objects the stabilizing of stakes for truck bodies, the adaptation of the body to various kinds of loads, the provision of means for stabilizing the engagement of a gate member with the body structure, and the separable connection of body sections whereby the body members are firmly joined and easily removed and replaced by one person, and a variety of means of access to the body are provided.

In accomplishing these and other objects of the invention I have provided improved details of structure, the preferred forms of which are illustrated in the accompanying drawings, wherein:

Fig. 1 is a perspective view of a truck body embodying my invention mounted on a chassis, a retaining band being partly displaced to expose body members.

Fig. 2 is a plan view of the body.

Fig. 3 is a detail view of section connecting elements.

Fig. 4 is a detail sectional view of corner connecting elements.

Fig. 5 is a sectional view of the rear end of the body.

Fig. 6 is a detail fragmentary view of the sill and stake retaining features.

Fig. 7 is a detail sectional view through a stake pocket.

Fig. 8 is a detail perspective view of the bed, and stake and floor supporting elements.

Referring in detail to the drawings:

1 designates the frame of a vehicle illustrated as a motor truck for commercial freighting on which are mounted longitudinal sills 2 secured to the frame by U bolts 3, and supported crosswise by the sills are cross sills or joists 4, the joists having notches 5 and 6 at the top and bottom of their ends to receive ribbon boards 7 and 8. The upper ribbon boards 7 are rabbeted as at 9 to receive the outer edges of outer floor boards 10 supported by the joists, and have vertical grooves 11 on their outer edges to receive stakes 12 which extend through similar grooves 11' in the lower ribbon boards 8. The joist 4 across the front end of the body is designated 13 and has a groove 14 to receive floor boards, and stake-receiving grooves 15.

A relatively wide metal band 16 formed of relatively long sections and preferably continuous is arranged around the body and is fixed to the ribbon boards and end joists by bolts 17 to retain and rigidly support the stakes, the stakes being braced by the ribbon boards through their retention in the vertically aligned pockets of the ribbon boards. The band, further, tends to support the ends of the intermediate cross joists, and the ribbon boards, against deflection by loads exerting pressure on the outer longitudinal margins of the middle portion of the truck where joist-stiffening end structures are lacking, the band serving as a truss for stiffening the joists and ribbon boards and distributing the load. A further special joist 18, however, is preferably arranged outside the rear end joist, and has grooves 19 to receive the stakes which are stabilized and retained by the adjacent joist.

The stake structure of the body is preferably formed in sections, comprising a plurality of stakes joined by parallel bars 20, and the sides of the body comprise a plurality of sections, such as 21 and 22, connected by a gate section 23 slidable between the two sections for opening and removal independently thereof. Side stakes 24 of the gate section extend laterally from the ends of the bars 20, the extending portions being provided with vertical grooves 25, and plates 26 are fixed to the bars opposite to and in registry with said stakes by bolts 27 to provide channels or sockets 28, to receive the vertical edges of adjacent sections. Supporting angle flanges 29 are secured to the ends of the bars of the adjacent sections, the channels 28 being adapted to receive the bar ends together with the supporting flanges, and eye bolts 30 extend through apertures 31 of the gate stakes and through apertures 32 in the angle flange for engagement with wing nuts 33 for securing the gate to the adjacent sections.

Angles 34 are secured to ends of bars of end sections having flanges 35 spaced from the bar ends for receiving the ends of bars of side sections, the corners of the stake structure being connected by bolts 36 having hooks 37 engageable with stakes adjacent the ends of the side sections, the screw threaded ends of the bolts being projectible through openings 38 in the angles and held in engagement therewith by wing nuts 39.

The rear end of the body comprises sections 40 and 41 connected with the sides as described, and spaced to constitute a gate opening, the opposite section stakes designated 42 and 43 having grooves 44 wherein the bars of a gate member 45 are slidably retained.

Mounted on one of the retaining stakes, for example, the stake 42, are pin hinge members 46 for receiving the hinges 47 for supporting said gate member 45. The gate member preferably comprises halves or leaves 48 and 49 hinged as at 50, reinforcing bars 51 being secured to the outer faces of the stakes of the leaf 48, and the opposite leaf 49 having latches 52 movable to engage the reinforcing bars 51 to latch the leaves in closed position. The rear end structure is reinforced by a beam 53 supported by brackets 54 erected on the inner faces of selected stakes of the gate-supporting sections, the beam being held in engagement with said sections by eye bolts 55 and wing nuts 56, and stabilized by ears 57 fixed to the beam and having flanges 58 engageable with selected stakes such as 42 and 43.

Incidental features for stabilizing structure and providing accessory conveniences may be installed including the chute-supporting rack or bar 59 trussing the sills at the rear end of the body, on which a pipe 60 is sleeved.

Assuming the vehicle equipped with a body embodying my invention, it is apparent that the stakes are slidably but rigidly supported in the grooves of the ribbon boards and joists by the rigid band and the complementary joist, whereby racking, loosening and displacement of the stakes due to relatively fragile nature of the stake-retaining straps ordinarily provided are prevented. The side members of the body in whatever number provided to suit possible demands for various sizes and positions of side gates, are relatively staple and securely connected by the angles and fastening bolts illustrated, and any gate section of the side member can easily be released from fixed engagement and moved slidingly to provide an opening or be entirely removed. The side and end members of the body may be securely and rigidly attached at their meeting corners by means that can be tensioned for mounting a body; and that can be disengaged quickly for removal of the stake structure or any sections thereof. The rear end elements provide a gate structure having multiple uses; for example, the latch may be released for permitting the hinged leaves to break and permit the gate to swing open, or the hinged gate may be raised from its hinges and slid in the grooves of the adjacent sections to provide a small and low opening. The hinged gate may be lifted further and removed from the body. The reinforcing beam at the top of the rear end structure may be removed to permit loading of animals or other objects for which the beam would be an obstruction.

It is apparent that a stake structure may be provided for use in embodiments of this invention having lateral members completely closing the body, instead of the slatted structure illustrated, for carrying grain. I preferably provide relatively wide bars or boards for the lower portion of the stake structure.

What I claim and desire to secure by Letters Patent is:

1. In a truck body, upper ribbon boards having rabbet grooves in their upper faces and spaced, vertically arranged notches in their outer faces, lower ribbon boards spaced from the upper ribbon boards and having notches on their outer faces aligning with the notches in the upper ribbon boards, a metal band overlying the outer faces of said ribbon boards and forming a closure for said notches to form stake pockets, means for securing the band to said ribbon boards, joists having notched ends to accommodate said ribbon boards and form tongues engaging between said ribbon boards and against the metal band to anchor said joists, whereby the upper faces thereof lie flush with the bottoms of said rabbet grooves, a floor supported on said joists and having side edges engaged in the rabbet grooves, and stakes engaged in said stake pockets.

2. In a truck body, upper ribbon boards having rabbet grooves in their upper faces and spaced, vertically arranged notches in their outer faces, lower ribbon boards spaced from the upper ribbon boards and having notches on their outer faces aligning with the notches in the upper ribbon boards, a metal band overlying the outer faces of said ribbon boards, bolts extending through the ribbon boards and the band to secure the ribbon boards to the band, joists having notched ends to accommodate said upper ribbon boards and form tongues engaging between the boards and against the metal band to anchor the joists, whereby the upper faces of the joists lie flush with the bottoms of the rabbet grooves, a floor supported on said joists and having edges engaged in the rabbet grooves, and stakes engaged in said notches.

3. In a truck body, side sills including spaced upper and lower ribbon boards having spaced, vertically arranged notches in their outer faces, a metal band overlying the outer faces of the ribbon boards and closing said notches to form stake pockets, means for securing the metal band to said ribbon boards, end sills having tongued ends engaging between the ends of the ribbon boards of the respective side sills and having rabbet grooves in their upper inner edges, joists having notched ends to provide tongues for engaging between said ribbon boards, whereby the upper faces of said joists lie flush with the bottoms of said rabbet grooves, a floor supported by said joists and having side and end edges engaged in the rabbet grooves, whereby the floor lies flush with the upper faces of said sills, and stakes engaged in said stake pockets.

In testimony whereof I affix my signature.

MYLES STANDISH.